Patented Aug. 21, 1934

1,970,663

UNITED STATES PATENT OFFICE 1,970,663

CALCIUM SULPHATE PLASTER MIX

Victor Lefebure, London, England, assignor to Imperial Chemical Industries Limited, a corporation of Great Britain No Drawing. Application June 17, 1932, Serial No. 617,861. In Great Britain June 23, 1931

11 Claims. (Cl. 106—34)

This invention relates to calcium sulphate plaster mixes of the accelerated anhydrite type and to methods of applying the same, and its principal object is to provide mixes giving porous sets by the creation of voids, cells or spaces in the body of the plaster, such porous sets possessing heat and sound insulating properties in high degree. By the expression "calcium sulphate plaster mix of the accelerated anhydrite type" is meant any plaster mix the setting properties of which are essentially due to the hydration of anhydrous calcium sulphate in its mineral or natural form under the influence of small proportions of suitable accelerators, e. g. alkali metal salts, certain metal sulphates, or mixtures thereof.

It has already been proposed to produce highly porous cement and mortar products by incorporating into cement or mortar constituents a substance which is capable of reacting with water and alkaline solutions, such substance entering into combination with the oxygen of the water to form a non-volatile compound, while the hydrogen of the water escapes in the form of a gas. It has also been proposed to make porous compounds or compositions formed from gypsum by utilizing a mixture of partly dehydrated gypsum (not dehydrated to the extent that a conversion of the mass to a dead burnt material occurs) and a substance, e. g. a carbonate, which will react with a dilute acid to form a gas so that when the dilute acid is added to the mixture, the partly dehydrated gypsum absorbs water, and setting of the mass commences, and at the same time an evolution of gas takes place and consequently a porous mass is obtained.

I have now found that it is possible to combine the functions of such a gas-producing agent and accelerator for plasters of the accelerated anhydrite type, thus simplifying the composition of the mix required to give a porous set, minimizing the cost and avoiding difficulties due to uncertain influences upon the set, of the gas-producing agent and/or its reaction products. The term "gas-producing agent", as herein used, connotes a system of two or more substances adapted to react together with the formation of a gas which is capable of distending the surrounding plastic.

According to the invention, in the production of porous sets of the type described, the gas-producing agent is selected such that one or more of the reactants or resultants functions as accelerator for the hydration of the anhydrite. Thus the gas-producing agent may consist of the system:— calcium carbonate-(water)-aluminium sulphate, in which case the acid-reacting aluminium sulphate, in addition to functioning as accelerator, decomposes the calcium carbonate and generates carbon dioxide gas. Again the gas-producing agent may be zinc metal-(water)-sulphuric acid, the resulting zinc sulphate acting as accelerator. Various other gas-producing agents, may, of course, be employed in conformity with the invention. Usually quite small proportions of the gas-producing agent are sufficient to give the desired effect, inasmuch as the accelerator need only be present, in most cases, in amounts up to say 4 per cent. of the anhydrite. The relative proportions of the components of the gas-producing agent need not correspond stoichiometrically, but care should be taken that free acid, if such is used, is not left in excess as experience shows that it interferes with the set. Additional accelerators not taking part in the gas-producing reaction may be present, e. g. potassium sulphate. The use of an independent accelerator in small quantities is often advantageous. For example, aluminum sulphate is a useful accelerator in addition to its advantages as a gas producing agent. But the quantities of calcium carbonate in these plasters vary, and in the event that the calcium carbonate happens to be more than or equal to the quantity of aluminum sulphate required for reaction, no aluminum sulphate will be left over. The use of an independent accelerator is therefore a safeguard, eliminating irregular results possible because of the accidental presence of varying amounts of carbonate in the initial anhydrite material.

The use of hydrated aluminium sulphate in some excess reacting with a carbonate as gas-producing agent is especially advantageous since it allows a maximum void development without causing premature setting, as distinct from the use of a gas-producing agent such as a mineral acid and a carbonate, in conjunction with a neutral accelerator such as potassium sulphate, in which case the setting may interfere with the void development.

In the manufacture of plaster mixes according to the invention, the solid raw materials may be mixed together in the dry state and the mixture gauged with water in the usual way. Alternatively, one of the ingredients of the gas-producing agent, or the additional accelerator if such is employed may be dissolved or suspended in the water used for gauging the mass, or added as a concentrated solution to the wet plastic depending upon the use to which the plaster is to be put.

In applying the above methods it has been found that the rate of expansion of the plastic is sometimes too great in relation to the rate of setting, so that the plastic expands beyond its strength and partial collapse occurs in the lower layers owing to the weight of the superposed material, thus giving rise to an inferior product. It is therefore desirable to enhance the rate of setting in such cases, but this is difficult to accomplish without loading the plaster with undesirably high proportions of accelerators, which impair the strength of the product, add to its cost and otherwise introduce objections.

I have found however, that excellent quick-setting mixes of the kind described, which are free from the above mentioned drawback, are obtained by including a proportion, e. g. up to 20 per cent. of plaster of Paris, or other calcium sulphate plaster of the hemihydrate type, in the mix. The resulting mixes, when gauged with water, have greatly accelerated speeds of sets as compared with those not containing plaster of Paris or the like and by varying the proportions of plaster of Paris or the like the speed can be adjusted to meet the requirements of any particular case, depending upon the rapidity of gas evolution in the plastic.

The plaster of Paris or the like may be added as a dry ingredient to the mix, or it may be gauged separately with water and the resulting plastic poured into the main plastic immediately before pouring the whole into the moulds. This method allows moulds of considerable depth, e. g. 2 feet or more, to be produced.

The accelerating influence of hemihydrated calcium sulphate upon the setting of anhydrite has already been pointed out in British Patent 337926, but the present invention utilizes this property in a particularly advantageous way in connection with the setting of porous or cellular plasters.

The distension of the mixes while setting may be controlled, apart from the chemical nature and proportions of the ingredients, by varying the rate and extent of gas generation within the plastic as follows:—

(1) A delayed expansion may be secured by including in the mix a small proportion of a protective colloid, e. g. glue, gelatine, or Bentonite mineral colloid. Also by previously coating the particles of solid gas-producing agent, e. g. carbonate, with such colloid, by wetting them with a dilute colloidal solution and allowing them to dry. The use of such coated particles inhibits the gas-producing reaction for a definite time, depending upon the extent of the coating and upon the amounts of gas-producing agent and reagent such as acid or alkali present, so that mixes can be obtained in which the bulk of the expansion does not occur until 15 minutes (or more) after gauging the mix with water.

(2) A delayed expansion may also be secured by employing the solid gas-producing agent in the form of compact particles, e. g. as formed by grinding hard carbonate mineral. Thus, in the case of calcium carbonate as gas-producing agent ground marble or dolomite may be employed in preference to precipitated chalk.

(3) A delayed expansion may also be secured by using ice-cold water for gauging the plaster.

In carrying the invention into effect I may use as raw material natural anhydrite containing a small percentage of carbonate in the form of calcium and/or magnesium carbonate, or carbonates of other metals. In case the mineral is deficient in carbonate a special addition of the same may be made. Thus ground anhydrite containing say a carbonate content equivalent to 1 per cent. by weight of carbon dioxide may be mixed with 1 per cent. of powdered hydrated aluminium sulphate $(Al_2(SO_4)_3 18H_2O)$:

On gauging with 30–40 per cent. by volume of water the plastic gradually sets to a hard mass, the volume increase being 50–75 per cent. If 2 per cent. of hydrated aluminium sulphate is used the volume increase is about 100 per cent. and if 3 per cent. is used, the volume increase is 200–300 per cent. In each case the dry set mass is strong, resistant and does not easily crumble, those masses with volume increase up to 100 per cent. being for all practical purposes, apparently as strong as the original plaster which sets with little or no volume change.

In the case of a plaster containing a substantial proportion of basic ingredients, such as lime, it is sometimes advantageous to employ finely divided zinc or aluminium as gas-producing agent, so that on mixing with water the gas-producing reaction sets in without special addition of alkali, although such may be made if desired. In this case also the reaction products, e. g. aluminates, may function as accelerators, but preferably additional accelerators of neutral or alkaline nature are employed, e. g. potassium sulphate, or potassium carbonate, in a proportion of around 1 to 15 per cent. based on the anhydrite.

The following examples illustrate practical applications of the invention:—

Example 1

A mix sufficient to make 24 blocks of dimensions 2 feet by 1 foot by 3 inches is prepared from the following ingredients:—

| | Lbs. |
|---|---|
| Anhydrite | 686 |
| Aluminium sulphate | 29 |
| Potassium sulphate | 7 |
| Chalk | 3 | water is added in amount between 23.7 and 25.6 per cent, calculated on the weight of the dry solids. The mix begins to stiffen in about 15 minutes and the mould can be stripped after about 3½ hours, although generally it is preferred to strip the mould only after 24 hours. The top of the block is levelled by cutting off the surplus material, after the initial stiffening of the mass, followed by skimming the surface with a trowel. Alternatively the whole mass can be allowed to set firmly and the top levelled by sawing off a sufficient thickness of material.

Example 2

About 12 parts by weight of anhydrite are mixed with about 1 part by weight of plaster of Paris, ½ part by weight of aluminium sulphate, ⅕ part by weight of potassium sulphate, 1/10 part by weight of finely divided chalk and about 4 parts by weight of water. This mixture is poured into a suitable mould, when in a few minutes, according to temperature and general conditions, it rapidly rises to an expansion of from 2 to 2½ times the original volume. In 15 minutes the full expansion has occurred, without collapse, and the material has consolidated sufficiently for the top projecting material to be cut out or skimmed.

Example 3

A normal anhydrite plaster accelerated with 2 per cent of potassium zinc sulphate is mixed with 5 per cent by weight of hydrated lime and 1 per cent of powdered aluminium. The mix is gauged with 30 per cent of water. Noticeable expansion begins in about 15 minutes and reaches a maximum in 1-2 hours. The expansion in this case is about 100 per cent of the original volume.

The improved mixes and sets obtained according to the invention may include pigments and/or filling materials such as sand, pumice, cork, clinker, brick dust, or fibrous materials. Such mixes still give substantial volume increases, e. g. a mix of ground anhydrite containing carbonate equal to 1 per cent by weight of carbon dioxide, together with 2-3 per cent of aluminium sulphate and 1-2 parts by volume of sand, slowly rises to an increased volume of about 100 per cent and remains in this expanded but plastic and manageable state for several hours if held in or on the usual non-absorbent container such as a pail or bath. The material can then be taken by the plasterer and handled in the usual way, with trowels and similar tools for backing, leaving on the wall a plaster-sand backing of spongy character, which sets to a hard mass like an ordinary plaster-sand backing. The resulting backing may then be faced in the usual way with a thin coat of neat plaster.

Such a backing has the advantage of heat and sound insulation, the latter being a very important commercial requirement: it shows, for a given thickness, a marked advantage in cost owing to its lower density. The plaster backing is found to retard penetration of water and damp, thereby obviating harmful effects upon surface decoration.

The improved mixes obtained according to the invention may be applied to surfaces by trowelling or, in the case of a mix of slow expansion, by spraying. It is also possible to apply the wet plastic and gas-producing agent separately.

The improved mixes obtained according to the invention may also be employed as a thin wash or coating to give such decorative effects as irregular, crinkled or stippled surfaces, which are sometimes desirable. Such surfaces, when set, not only possess heat and sound insulating properties but they are not subject to the difficulties involved in after decoration which arise in the case of Portland cement faces. In common with plasters of the accelerated anhydrite type they are adapted for rapid and permanent non-defective painting and similar decoration.

The improved mixes obtained according to the invention are particularly suitable for the manufacture of moulded or pre-formed articles.

As many apparently widely different embodiments of this invention may be made without departing from the spirit and scope thereof, it is to be understood that I do not limit myself to the specific embodiments thereof except as defined in the appended claims.

I claim:

1. A method of producing a porous set article which comprises mixing finely divided mineral anhydrite with small proportions of chalk, potassium sulphate, and aluminium sulphate, the last being in excess of the amount of chalk, gauging the mix with water and allowing it to expand and set in a mould.

2. A method of producing a porous set article which comprises mixing 12 parts of mineral anhydrite with 1 part of plaster of Paris, and with small proportions of chalk, potassium sulphate and aluminium sulphate, gauging the mix with water and allowing it to expand and set in a mould.

3. A method of producing a porous set article which comprises mixing finely divided mineral anhydrite containing 2 per cent of potassium zinc sulphate with 5 per cent of hydrated lime and 1 per cent of powdered aluminium, gauging the mix with water and allowing it to expand and set in a mould.

4. The method of producing a porous set mass in the setting of a mix comprising a calcium sulphate plaster of the accelerated mineral anhydrite type which comprises generating gas within a plaster mix of this character by means of a gas producing mixture of reagents, producing an accelerator by their reaction, the quantities and proportions of the reagents being so chosen that the accelerant produced is present in excess throughout the gas generating and setting phases.

5. In the method of claim 10 utilizing as the gas producing mixture of reagents a system composed of calcium carbonate, water and aluminum sulphate, the aluminum sulphate being in excess over the carbonate.

6. In the method of claim 4 a gas producing mixture of reagents comprising a finely divided metal and a reagent which will react with the metal to give off gas.

7. In the method of claim 4 utilizing a mix also comprising an independent accelerator not taking part in the gas producing reaction.

8. In the method of claim 4 including in the mix a small proportion of hemihydrated calcium sulphate.

9. In the method of claim 4 utilizing in the mixture of reagents finely divided zinc metal and sulphuric acid.

10. The method of producing a porous set mass in the setting of a mix comprising a calcium sulphate plaster of the accelerated mineral anhydrite type which comprises generating gas within a plaster mix of this character by means of a gas producing mixture of reagents, one of such reagents having an accelerating function and being present in excess to enable it so to function throughout the gas producing and setting operations.

11. The method of producing a porous set mass in the setting of a mix comprising a calcium sulphate plaster of the accelerated mineral anhydrite type which comprises generating gas within a plaster mix of this character in the presence of an accelerator by means of a gas producing mixture of reagents, the accelerant being present in excess throughout the setting and the gas producing operations.

VICTOR LEFEBURE.